Figure 1:
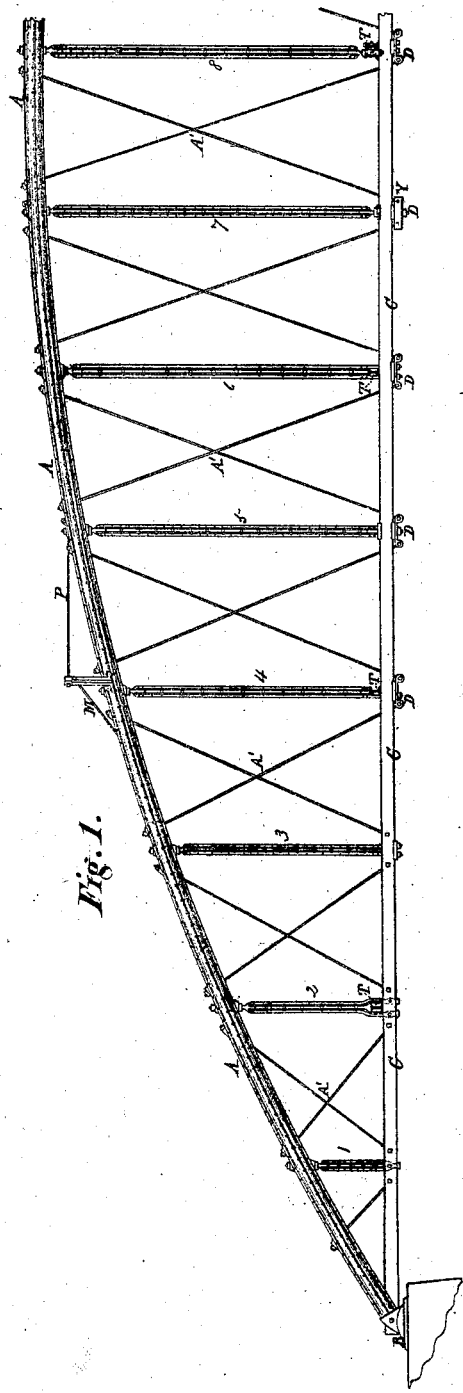

6 Sheets--Sheet 1.

D. HAMMOND, M. ADLER & J. ABBOTT.
Iron-Bridges.

No. 135,802.  Patented Feb. 11, 1873.

Witnesses:
George E. Buckley
Jennie M. Grant

Inventors:
David Hammond
Micheal Adler
Job Abbott
by Job Abbott, Attorney.

AM. PHOTO-LITHOGRAPHIC CO. N.Y. (OSBORNE'S PROCESS.)

6 Sheets--Sheet 2.
D. HAMMOND, M. ADLER & J. ABBOTT.
Iron-Bridges.
No. 135,802. Patented Feb 11, 1873.
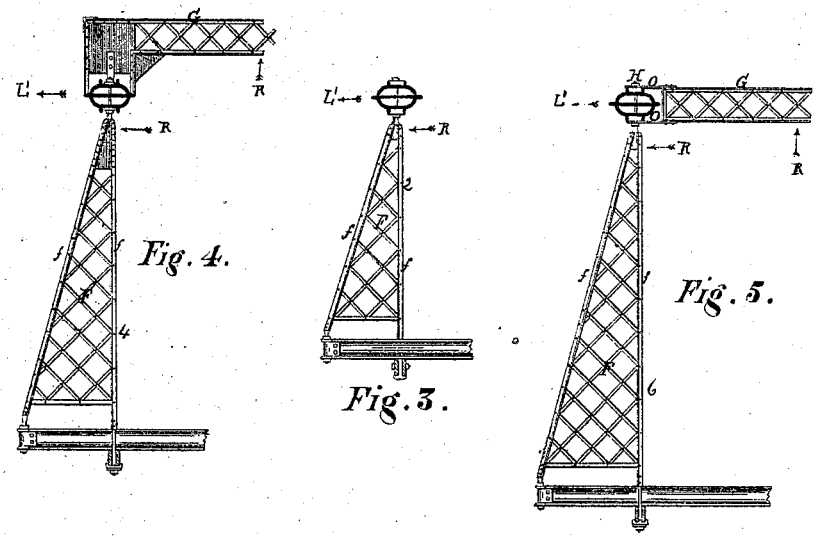
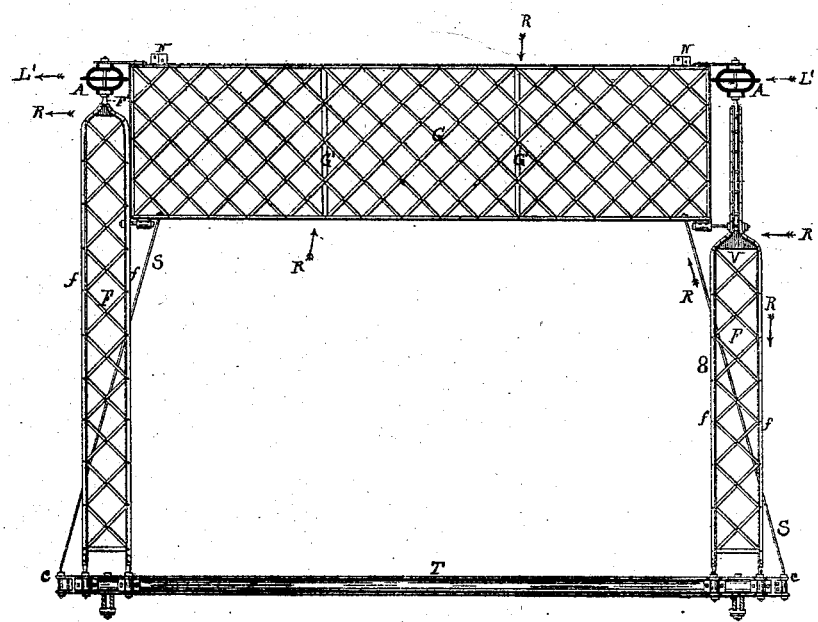

6 Sheets--Sheet 3.
D. HAMMOND, M. ADLER & J. ABBOTT.
Iron-Bridges.
No. 135,802.
Patented Feb. 11, 1873.
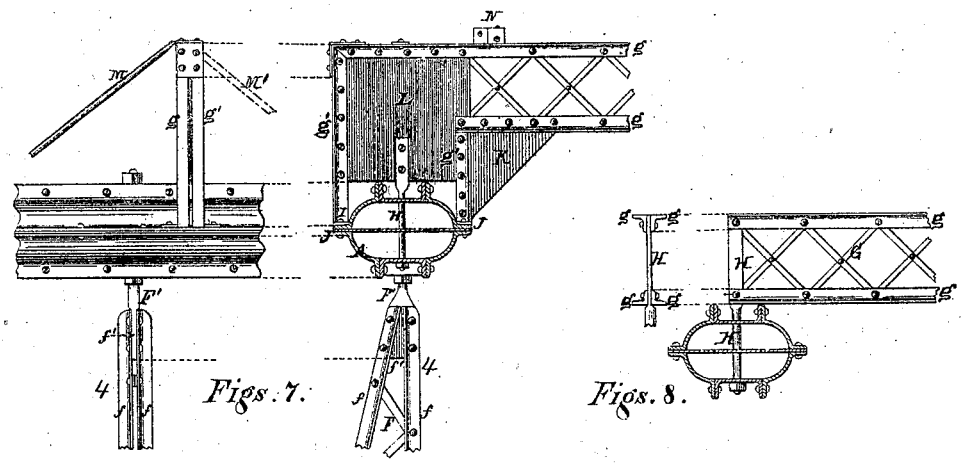
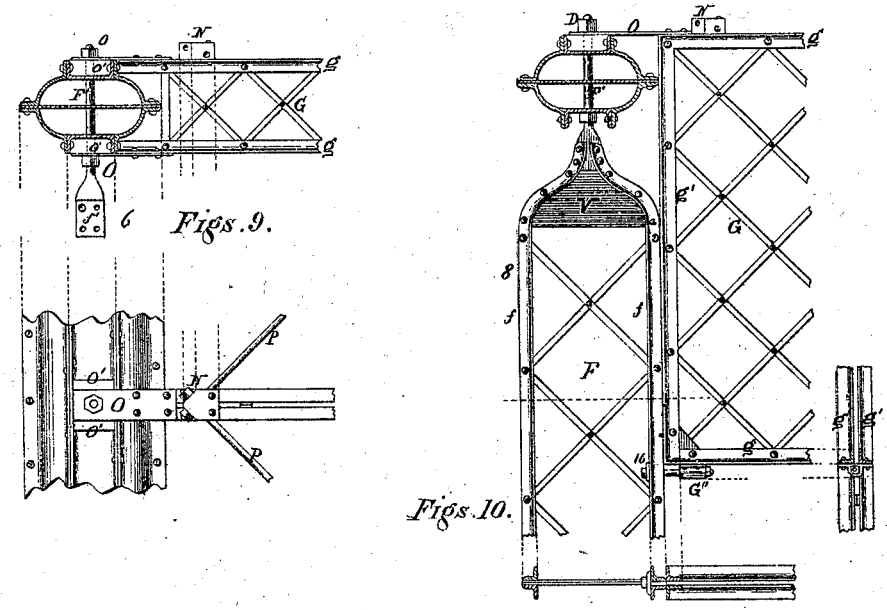
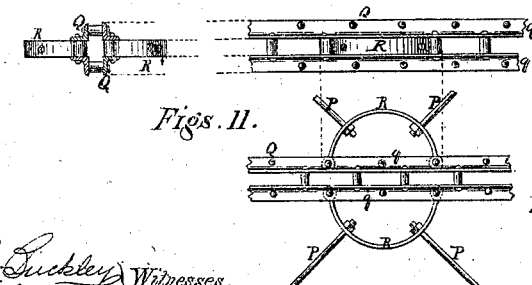

6 Sheets--Sheet 4.
D. HAMMOND, M. ADLER & J. ABBOTT.
Iron-Bridges.
No. 135,802. Patented Feb. 11, 1873.
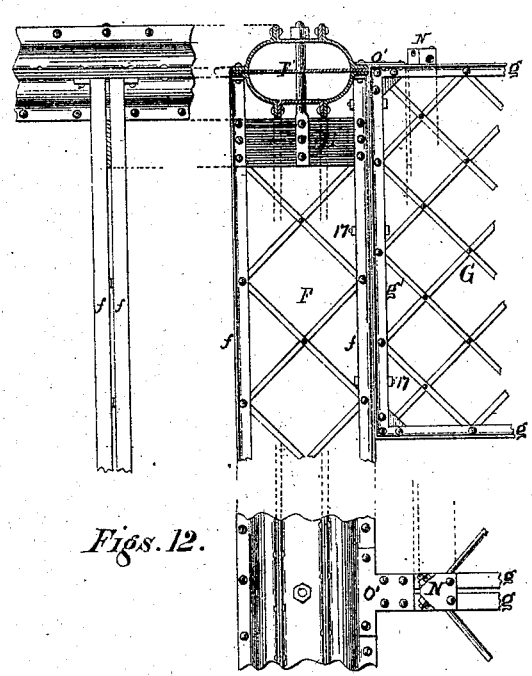
Figs. 12.
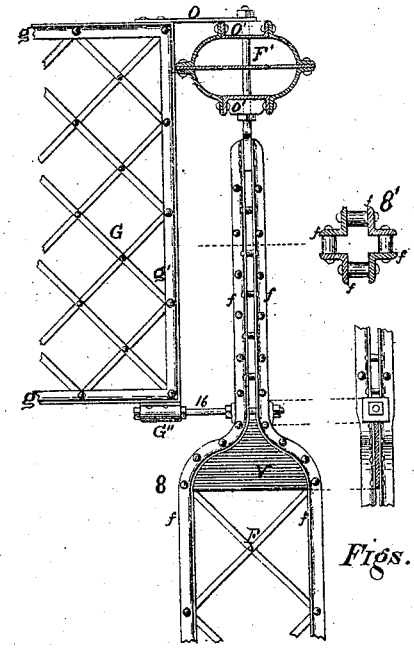
Figs. 13.
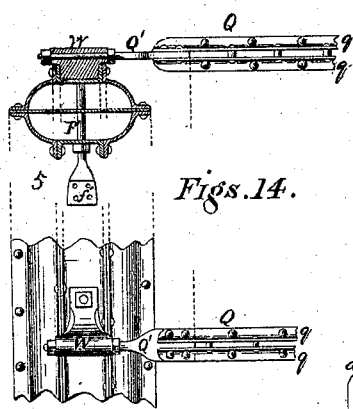
Figs. 14.
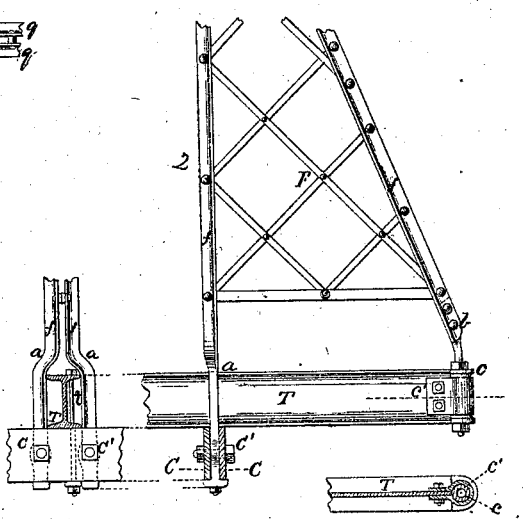
Figs. 15.
Figs. 16.
Witnesses: George E. Brickley, Jennie M. Grant
Inventors: David Hammond, Micheal Adler, J. Abbott
by J. Abbott, Attorney.

6 Sheets--Sheet 5.
D. HAMMOND, M. ADLER & J. ABBOTT.
Iron-Bridges.
No. 135,802.          Patented Feb. 11, 1873.
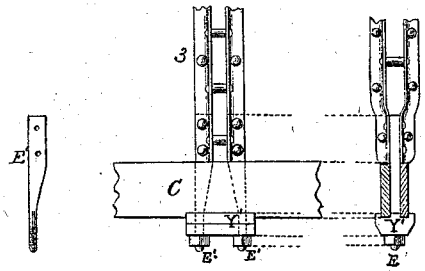
Figs. 17.
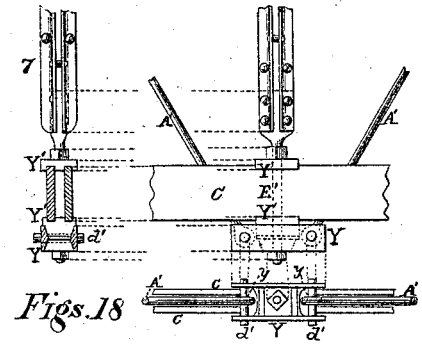
Figs. 18.
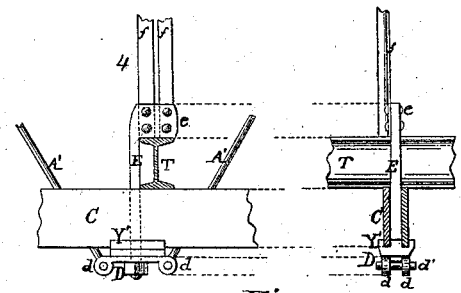
Figs. 19.
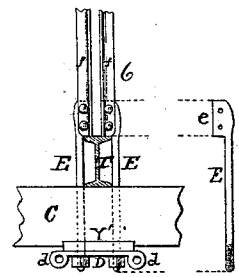
Figs. 20.
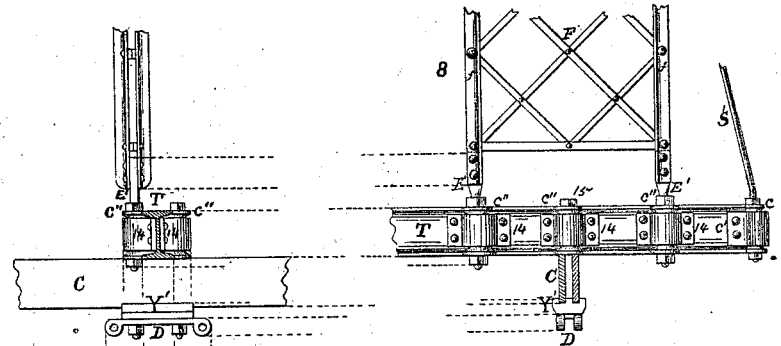
Figs. 21.
Figs. 22.
Figs. 23.
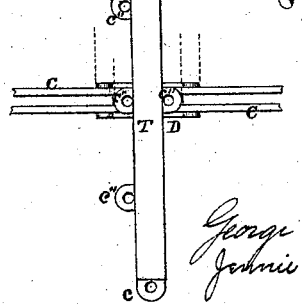
Witnesses:
George E. Buckley
Jennie M. Grant
Inventors:
David Hammond
Michael Adler
Job Abbott
by Job Abbott, Attorney.
AM. PHOTO-LITHOGRAPHIC CO. N.Y. (OSBORNE'S PROCESS.)

D. HAMMOND, M. ADLER & J. ABBOTT.
Iron-Bridges.
No. 135,802.
6 Sheets--Sheet 6.
Patented Feb. 11, 1873.
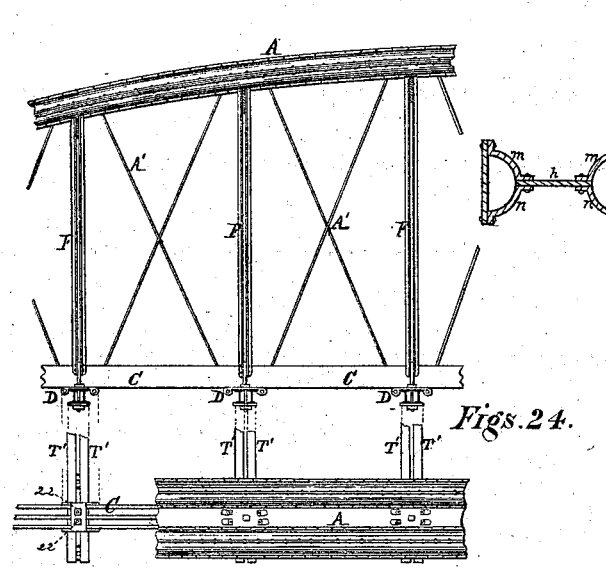
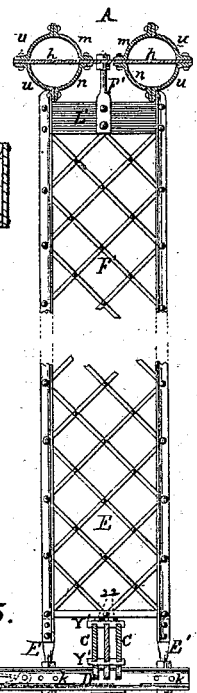
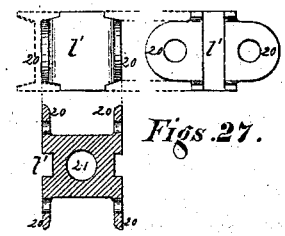
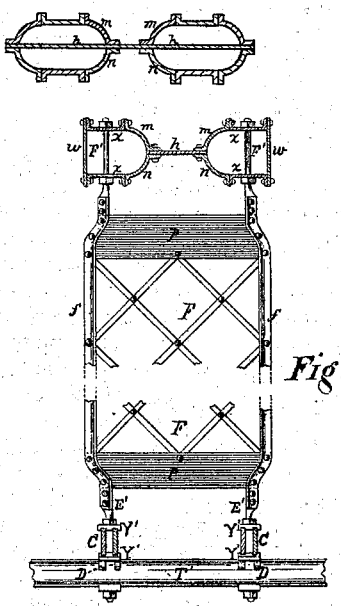
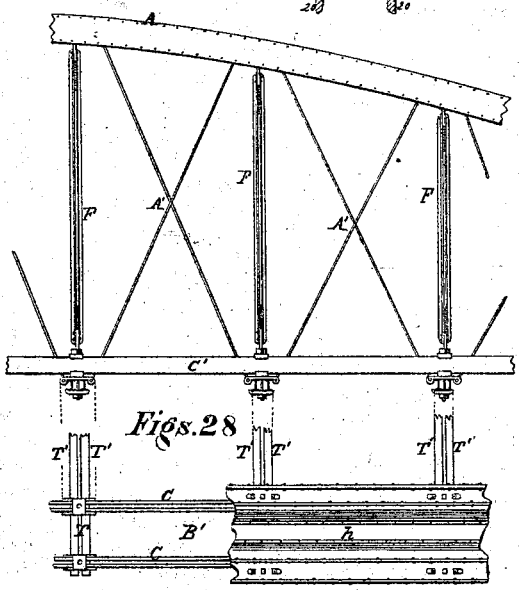

UNITED STATES PATENT OFFICE.

DAVID HAMMOND, MICHAEL ADLER, AND JOB ABBOTT, OF CANTON, OHIO.

IMPROVEMENT IN IRON BRIDGES.

Specification forming part of Letters Patent No. 135,802, dated February 11, 1873.

*To all whom it may concern:*

Be it known that we, DAVID HAMMOND, MICHAEL ADLER, and JOB ABBOTT, of Canton, in the county of Stark and State of Ohio, have invented certain new and useful Improvements in Arch-Girder Bridges; and that the following is a full, clear, and exact specification thereof, which will enable others skilled in the art to make and use the said invention.

It is well known to bridge constructors that the principal defect in the practical working of bow-string girders as heretofore constructed, especially in long spans, has been their want of sufficient stiffness to resist the action of a rolling load; that the lack of vertical stiffness has usually resulted from the want of sufficient compressive capacity in the posts, and the lack of lateral stiffness—first, from want of proper rigidity in the lower brace-beams; second, from the imperfect manner of securing points of the arch by struts from the brace-beams; third, from the insufficient character of the overhead lateral bracing between the bridge-girders; and, lastly, from the want of sufficient lateral capacity in the arches of the girders; and that great difficulty has been experienced in overcoming these objections to this class of highway bridges, especially in this country—first, because the requirement of cheapness has prevented the use of exact and expensive details of construction in said bridges; second, because, as arch-bridges are practically constructed, it is necessary to have some adjustment in the length of the members of the vertical bracing in the girders, in order to allow for the variation in the form which the arches of the girders assume when erected in the bridge-span from the form which they have when lying on the trestles at the shop; and, lastly, because the requirement of sidewalks for highway bridges, in many cases, limits the width of the bearing between the lower beams and arches, so as to make it very difficult to obtain the proper lateral strength in long spans, where the distance between the arches and chords is very considerable.

Our invention is designed to obviate these objections to the plan of bow-string-girder construction for bridges of moderate spans, and to make it applicable to long bridge-spans, in which it has heretofore been considered inapplicable; and to this end it consists in the combination, with a bow-string girder, of an iron lattice girder-brace post, which has an adjustable attachment either at the chord or arch of the girder, or at both of said points, and which is solidly secured to the lower brace-beams of the bridge and to the arch, so as to oppose the transverse stiffness of the lattice-girder to any tendency of the arch to move in a lateral direction. Said invention also consists in the combination, with the arches of the bridge-girders, of an iron lattice overhead girder, which is raised above the arches in order to give the proper headway on the bridge in cases where it could not otherwise be used, or which is used between the arches in cases where there is sufficient height to give the proper headway, and which, in either case, is rigidly secured to the arches, so as to oppose the transverse stiffness of the lattice-girder to any tendency to a lateral motion of the arches and girders. Said invention also consists in the combination, with the arches and brace-posts, of the bow-string girders of a bridge, of an iron lattice overhead girder, which is rigidly secured to said arches and to the lattice-posts below the arches, so as to oppose the lateral motion of the arches by both the transverse stiffness of a lattice-girder of considerable depth and by the strength of the brace-post against a force applied to bend it at a point considerably below its head, and hence acting with less leverage than if applied to the arch, as in the case of the overhead lattice-girder described in the preceding clause. Said invention also consists in the combination, with the lattice brace-posts and overhead lattice-girders of a bow-string-girder bridge, of a tension-rod extending from the outer part of the lower brace-beam across the post to the overhead lattice-girder, and acting as a tensional tie, in combination with the brace-post acting as a compressive strut in securing the arches and girders against lateral motion. Said invention also consists in the combination, with the arches of a bow-string-girder bridge, and with the lateral overhead members at the heads of the brace-posts, of lateral overhead struts secured to the arches at the heads of the intermediate posts betwee the brace-posts, and connected by half-rings at their centers to the lateral diagonal ties from the ends of the lateral members at the heads of the brace-posts, by which means the arches are secured against lateral bending at the heads of the intermediate posts without any addition of diagonal ties above those required to brace the arches only at the heads of the brace-posts. Said invention also consists in the construction of an arch composed of a central horizontal plate and two segments of the Phœnix or Keystone column on each side as the essential base of construction of the arch, and having combined therewith suitable plates, channel-bars, and column-segments, as is hereinafter more fully shown, the whole forming a double tubular arch in which the required compressive capacity for long spans is obtained in connection with such breadth of arch as to prevent any danger of lateral deflection. Said invention also consists in the combination, with the lower chords and brace-posts of a bow-string-girder bridge, of a pair of rolled channel or ⌶ beams, trussed by a hog-chain on the under side, and held from upward deflection by a tension-rod on the upper side, said pair of beams extending from girder to girder of the bridge, and forming supports for the floor-joists of the bridge, as well as brace-beams for the system of bracing for the bridge. Said invention also consists in the novel details of construction for the lateral hitch-blocks for the attachment of the lateral diagonal ties to the brace-beams or lateral girders, the girder-blocks for the attachment of the lateral overhead girders to the brace-posts, the arch-block for the attachment of the lateral overhead struts to the arch at the heads of the intermediate posts, the combined wrought and cast iron chord-plate for the attachment of the vertical diagonal ties, and the connections for the brace-beams and posts, these several improvements in detail making our before-specified improvements in bracings of easy application to the other parts of the bridge, and greatly facilitating the construction of the bridge in the shop and its erection on the bridge-site.

Figure 2:
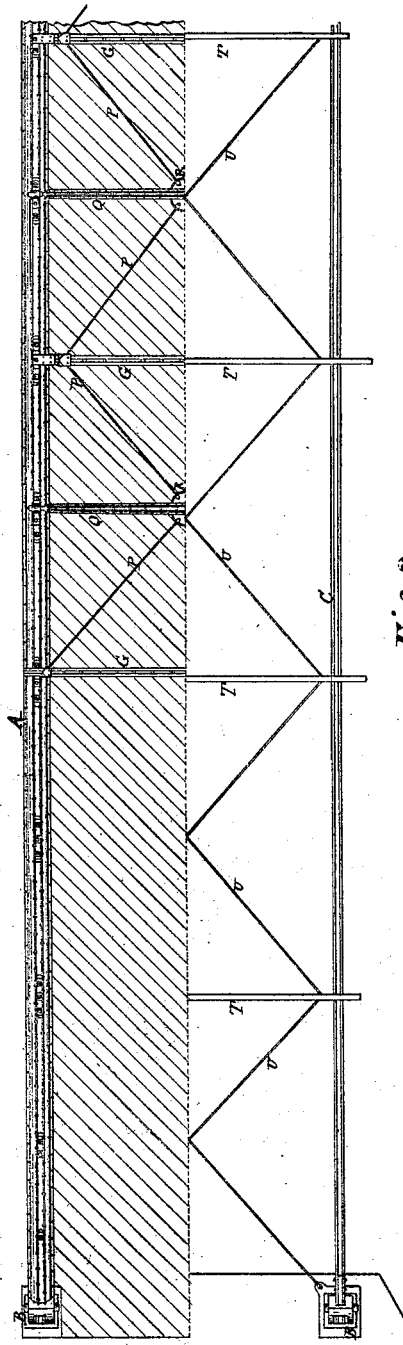

In the accompanying drawing, Figure 1 is an elevation of a half-span of a bow-string-girder bridge illustrating our improvements Fig. 2 is a plan of the same, showing a half-plan of the arch and bracing and a half-plan of chords. Figs. 3, 4, and 5 are side views of posts Nos. 2, 4, and 6 of said girder. Fig. 6 is a central cross-section of bridge at post No. 8, showing the deep overhead lattice-girder and two modifications of the lattice brace-posts. Figs. 7 are enlarged detail views of the end of the raised overhead lattice-girder and its arch attachments. Figs. 8 are views of a modified form of the same. Figs. 9 are detail views of the connections for the overhead lattice-girder between the arches. Figs. 10 are detail views of the connections for the overhead lattice-girders between the arches and brace-posts. Figs. 11 are detail views of the half-ring connections at the centers of the lateral overhead struts. Figs. 12 and 13 are detail views of modified forms of the constructions shown in Figs. 10. Figs. 14 are detail views of the arch-connections for the lateral overhead struts. Figs. 15, 16, and 17 are detail views of the lower chord-connections for posts Nos. 2, 1, and 3. Figs. 18, 19, 20, and 21 are detail views of the lower chord-connections for posts Nos. 7, 4, 6, and 8. Figs. 22 and 23 are detail views of the cast thimbles for the brace-beams. Figs. 24 are elevation and plan of portion of bow-string girder, showing one form of our improved arch and brace-beam construction. Fig. 25 is an enlarged end view of the same. Fig. 26 is an end view of the brace-beams in Fig. 25. Figs. 27 are detail views of the brace-beam and post-blocks. Figs. 28 and 29 are elevation, plan, and enlarged end view of a modified form of our improved arch and brace-beams.

A is an arch of the general form described in Letters Patent No. 102,392, granted to D. Hammond and J. Abbott April 26, 1870. The ends of said arch abut against cast shoes B, which rest on the abutments, and are connected by the chords C, composed of two or more plates of iron placed edgewise and abreast, and upon which the wooden floor-joists for the bridge are usually placed. The struts or posts Nos. 1 to 8 and the diagonal ties A' are arranged between the chords C and arch A, and iron brace-beams T are placed on the chords, usually at the foot of every other post, as in the ordinary plans of bow-string-girder construction, said brace-beams being united by diagonal ties U placed below the bridge-flooring, so as to form, with the chords C and ties U, a rigid system of lateral bracing, by which any lateral deflection of the bridge at the chord-level is prevented; the principal features of our invention consisting, first, in the improved construction of the brace-posts 2, 4, 6, and 8, by which the arch A is secured laterally from the system of bracing between the chords C; second, in the improved construction of the lateral overhead bracing, where the span of the bridge is such as to allow of the use of said overhead bracing; and, lastly, in the improved construction of the arches A, by which the lateral capacity of the arches themselves is so increased as to adapt them to very long spans.

We will describe the details of our improvements in the order indicated, that the mechanic may understand the application of our improvements to such length of spans as he may have to construct.

The triangular lattice-posts 2, 4, and 6 are specially designed for bridges without sidewalks, in which the projection of the post beyond the outer plane of the arch offers no obstruction to travel; and it is usually constructed of four angle-irons, $ff$, placed two at each side, and having between them the lattice-bars F, which are secured by rivets run through the parallel flanges of the angle-bars and the ends of the lattice-bars, and through the crossings of the lattice-bars. The flanges of the angle-bars at right angles to the plane of the posts are here shown on the inside, or toward the center of the posts; but, if preferred, they can be turned to the outside of the posts, and plates can be riveted to them to increase the capacity of the posts; or T-bars or star-iron (sometimes called X-iron) can be used at each side in place of two angle-bars, the lattice-bars being riveted to one leg of the T or X bar. The upper ends of the angle-bars $f$ are riveted in the recessed faces of the flattened ends $f'$ of the arch-bolt F', (see Figs. 7, 9, and 14,) which passes through the arch A, and is secured by jam-nuts above and below the arch; and in the form of chord-connection shown in Figs. 15 the inner angle-bars $f$ are bent out at $a$, to pass down on each side of the brace-beam T, and are flattened and headed below to fit between and support the chord-bars C C, which are clamped to them by through-bolts C' C'. The lower ends of the outer angle-bars $f$ have riveted between them the bolt $b$, which extends down through a cast thimble, $c$, with jam-nuts above and below, the rear end $y$ of said thimble (see Figs. 22) being of the form of the cross-section of the brace-beam T, to the end of which it is secured by a strap, $c'$, which fits around the recessed part of the thimble-body, and to the web of the brace-beam, to which it is riveted or bolted; the brace-beam T being rigidly secured to the chords C in this case by a bolt, $t$, (see Figs. 15,) passing through the flanges of the beams and between the chords, with washer and nut below. The form of chord-connection shown in Figs. 19 is, however, preferable to that shown in Figs. 15, as it avoids any blacksmith-work on the angle-bars $f$. It consists of a bolt, E, having a broad flat head, $e$, which fits over the beam T, and is riveted to the bars $f$, and which passed down between the chords C through a washer, Y', which is grooved to admit the chords, so as to hold them in position, and beneath which may be placed the tie-plate D, through which the bolt E extends, with nut below, as shown. The tie-plate D is designed to obviate the necessity of punching the chords C for a bolt to pass through the eyes on the lower ends of the diagonal ties A', which are placed between and secured to said chords in this way in the three end panels of the girder, shown in Fig. 1, and it consists of a wrought-iron plate having its end cut out in the center and turned over to form eyes $d$, like those on the broad leaf of a strap-hinge; the ties A' being secured to said plate by pins $d'$ passing through said eyes $d\,d$, and through the eyes on the ends of the ties A', which in this case extend down between the chords C' and between the eyes $d\,d$, as shown in Figs. 19. Figs. 20 shows a modified form of the chord-connection in Figs. 19, two bolts, E E, being used, one on each side of the beam T, instead of the single bolt E in the former case; the beam T being held from sliding, in this as in the former case, by clamping it between the chords C and bolt-heads $e$, or the ends of the angle-bars $f$, thus obviating the use of the bolt $t$, shown in Figs. 15. The intermediate posts 1, 3, 5, and 7 are designed to act simply as ties or struts without aiding materially in securing the lateral stability of the arch, and are constructed of four angle-bars, $f\,f\,f\,f$, riveted back to back in column form, with intervening thimbles, in the form shown in detached section 8' in Figs. 13. Their upper ends have an arch-bolt, F', riveted into them, in the manner described in Figs. 7, by which they are attached to the arch A, and the chord-connections are made either by a headed plate, E'', riveted between their lower ends and secured between the chords C C by bolt C', as shown in Figs. 16, or by means of two bolts, E', riveted between the angle-bars, and run down between the chords C, and through a grooved washer, Y', as shown in Figs. 17; or, where an adjustment in length at the lower end of post is desired, the single bolt E' may be used, with a grooved washer, Y', above and below the chords C, and with jam-nuts above and below said chords, as shown in Figs. 18.

The tie-piece Y shown in Figs. 18 is designed to be used in place of the tie-plate D in Figs. 19, and consists of a short piece of plate-iron with flanges bent on each edge, or of rolled channel-bar, or of rolled |-beam, having a space, $y$, cut out of its web at each end, and having its heads punched for the passage of the tie-pins $d'$. The lower grooved chord-plate Y' is made to fit in the upper part of the piece Y, and a filling-piece may be used on its under side to form a bearing for the nut on the lower end of the bolt E'.

The form of post shown at 8, Fig. 1, and in Figs. 6, 10, 12, 13, and 21, is designed particularly for bridges with sidewalks, in which the width of the post should not exceed the width of the arch. The angle-bars $f\,f$ composing its sides are placed parallel, instead of at an angle with each other, and are riveted to the lattice-bars F, as before described. The upper ends of these angle-bars are usually riveted to the arch-bolt F', as before shown, and the lattice-bars may be carried to the top of the space between the angle-bars, if desired, as shown on left hand in Fig. 6; but as the posts are subject to a compression under a rolling load on the bridge, the plate V should be riveted in between the bent upper ends of the bars $f$, as shown in Figs. 10, and the lattice-bars commenced below said plate, in order to secure the angle-bars more effectively against buckling in their bent parts.

Where the sidewalk-post is used in connection with a deep overhead girder, as shown on right hand in Fig. 6 and in Figs. 13, the angle-bars $f$ can be brought together near the lower edge of the overhead girder, and from thence run up to the arch-bolt F' in a column form, as shown, their upper portions being united, in the form shown in detached section 8', by means of rivets and intervening thimbles.

If no adjustment of the arch-and-post connection is required, the plate L' may be riveted between the angle-bars f, as shown in Figs. 12, and the arch-bolt F' be riveted to said plate, as shown, the ends of the angle-bars simply abutting against the arch-flanges, or being bent over and riveted to said flanges, as shown.

The bolts E' are riveted between the lower ends of the angle-bars f, as shown in Figs. 21, and are secured in cast thimbles c'', which are made with a rear flange, 13, shown in Figs. 23, which fits into the brace-beam T, to which said thimbles are secured by straps 14 bent into and around the recessed body of the thimble, and lying up to the web of the beam, to which they are riveted. This connection secures the post firmly to the brace-beam instead of to the chords, as in the other forms of posts, and the beam is secured to the chords C by bolts 15, which run through thimbles c'' (secured on each side of the beam T in the manner just shown) and pass down between the chords C, below which they are secured by washers and nuts in a manner evident from the preceding descriptions.

Where the span of the bridge is from ninety to one hundred feet and over it becomes practicable to use overhead bracing for the arch, the first form of which — the raised lattice-girder shown in Figs. 4, 7, and 8 — is used where the distance between the flooring of the bridge and arch is insufficient to allow of the placing of the girder between the arches. This girder is usually constructed of four angle-bars, g, although T or X iron can be used, as in the brace-posts, with intervening lattice-bars G riveted at each crossing; and the end angle-bars g' are combined with the body of the girder by plates L K riveted in at the corners of the girder, as shown, by which a very rigid construction is effected; though, if preferred, the lattice-work G can be carried out in place of the plate L, and the plate K be omitted; or either of the plates L or K may be used and the other omitted; but the use of both plates is to be preferred. The end angle-bars g' g' rest on the arch-flanges, to which they may be riveted by bending out their ends, and the bolt H is riveted to the plate L and runs down through the arch, with nut below, as shown in Figs. 7. In the modified and cheaper, though less rigid, form of construction, shown in Figs. 8, the arch-bolt H is flattened out and riveted between the angle-bars g g, the end angle-bars g' and plates L K being dispensed with.

At those points where the distance between the flooring and arch is sufficient to admit of it, the lattice-girder, shown in Figs. 5 and 9, is used, the depth of the girder being the same as that of the arch, and its ends fitting up to the arch, to which it is secured by plates O O riveted to the upper and lower angle-bars g, and having holes for the passage of the arch-bolt F' at the head of the brace-post.

At those points where the distance between the bridge-flooring and the arch is considerably more than the headway required, the deep lattice-girder, shown in Figs. 6, 10, 12, and 13, is used, the object being to secure greater transverse stiffness than could be economically obtained in the shallow girders, shown in Figs. 4 and 5. These deep girders are constructed with angle-bars g g' g and lattice-bars G, in the same manner as the shallow girders before described, the bars G', of angle or T iron, being riveted at intervals on the lattice-bars, as shown in Fig. 6, to stiffen the lattice-work against buckling sidewise. The upper corners of the girders are secured to the arches A by plates O riveted to the upper angle-bars g, which rest on the arch A, and through which the arch-bolts F' are passed. The lower corners of the girders are secured to the brace-posts by bolts 16, which pass between the angle-bars f of the posts through a washer at their back, and through a girder-block, G'', which is riveted to the lower angle-bars g of the overhead girders, as shown in Figs. 10 and 13, the bolt 16 being held by jam-nuts from sliding in either the girder-blocks G'', or between the angle-bars f, when the neck brace-posts, shown in Figs. 13, are used. The use of the girder-blocks G'' allows of the placing of the deep girder in position between the arches and posts after the bridge-girders have been raised, the bolt 16 being inserted after the girder is placed in such position, which is a great convenience in putting up the bridge, and which could not be conveniently effected were the bolt 16 riveted to the girder-flanges.

Where the straight-sided post, shown in Figs. 12, is used, the girder is attached to the arch by a T-shaped plate, O', riveted to the girder and arch flanges, as shown, and by one or more clamping-bolts, 17, run between the angle-bars of the lattice posts and girders, and bearing on washers at each end.

As will be seen in Fig. 2, the overhead lattice-girders G, of some of the forms just described, are used at the heads of each of the brace-posts 4, 6, and 8, where the height of the arch admits of their use. But these are alternate posts in the girder; and in order to brace the arch at the heads of the other posts 5 and 7, the lateral struts Q are used, these struts usually consisting of four angle-bars, q q, riveted together in column form, although other forms of compression members may be used. The bolts Q' are riveted to the ends of these angle-bars, as shown in Figs. 14, and are secured by jam-nuts in the arch-block W, which is made to fit on the arch C, where it is secured by the arch-bolt F' of the underlying post, this mode of constructing and attaching the arch-block W being, however, susceptible of modification by the use of a wrought-iron loop in place of the block, said loop being either riveted to the arch or secured thereto by the bolt F', and one or more additional bolts when required. The half-rings R are riveted between the angle-bars $q\,q$ of the struts Q, as shown in Figs. 11, and on the tops of the lattice-girders G are riveted the hitch-blocks N, which are secured by rivets passing down through the body of the blocks and the flanges of the girders, and which have holes for the passage of the lateral ties, and beveled end faces for the nuts at the ends of the lateral ties, and said ties P are run from the hitch-blocks N on the first girder G to the half-ring R on the first strut Q; thence from the opposite half-ring R on the same strut to the hitch-blocks N on the next girder G, and so on, as shown in Fig. 2, thus forming a system of brace-ties between the girders G, and at the same time securing the struts Q, and consequently the points of the arches at their ends, against lateral motion. The action of the lateral ties P on the first or raised lattice-girder G tends to bend said girder over sidewise, to prevent which a tie-rod, M, (see Figs. 1 and 7,) is run from near the top of said girder to a point on the arch considerably back of the girder; or, if preferred, a strut, M', can be used between the girder and arch, as indicated by dotted lines in Figs. 7. To aid the brace-posts 8 in resisting lateral deflection the tension-rods S are run from thimbles $c$ at or near the ends of the brace-beams T, across the posts 8, to the lower angle-bars of the overhead girders G, to which they are attached, as shown in Fig. 6.

The construction and application of the lattice-posts and overhead girders to the bridge-girders being thus fully shown, their action in preventing any lateral deflection of the bridge, arches, or girders will be evident from an inspection of Figs. 4 to 6, in which the arrows L' represent forces tending to deflect the arches and girders laterally, and the arrows R the resulting direction of strains thrown on the different parts of the bracing, from which it will be evident that no lateral motion of either the arches or girders can possibly take place without overcoming the transverse strength of one or more of the lattice members of the bracing, which are of such form that, with a very moderate amount of metal, they can be made sufficiently strong to bear any strains that may be brought upon them.

We have thus far explained our plans for increasing the lateral stability of bow-string girders simply by the aid of a more effective system of brace-posts and overhead bracing than has been before used, using, for the purpose of illustration, a moderate span of girder, with the well-known column and channel-iron arch, as being the form of arch to which these plans of lattice brace-post-and-girder construction have been the most extensively applied, and we will now describe our improved form of arch and brace-beam construction, by means of which the plan of bow-string-girder construction can be applied to almost any required length of span: The essential features of our improved arch consist of the horizontal plate $h$, which may be made of any width required to obtain the proper lateral capacity for the arch, and to which are riveted the four column-segments $m\,n\,m\,n$, two at each side, as shown. With these five essential parts are combined such other segments, channel-bars, and plates as may be required to form a double tubular arch of the proper cross-section—as, for example, in Fig. 25, the four segments $u\,u\,u\,u$ are riveted to the parts $m\,n\,h$, so as to form a double tubular arch with two tubes of a circular section, and in Figs. 29 the channel-bars $x\,x$ and plates $w$ are riveted to the parts $m\,n$, so as to form a double tubular arch of considerably greater capacity than that shown in Fig. 25. If a still greater capacity were required, two column-segments could be used in place of the plates $w$ in Figs. 29, so as to form two arch-tubes of the same section as the arch A, shown in Figs. 9, as shown in detached section above Fig. 29, the plate $h$ extending the full width of the arch, as shown, or only between the two tubes, as preferred; while, if a smaller section than that shown in Fig. 25 were desired, plates could be used in place of the column-segments shown in Fig. 25, thus forming a double tubular arch of the form shown by detached section between Figs. 24 and 25, the particular form of arch to be used in any case depending on the bridge-span and load, and being, therefore, a matter of judgment for the constructor.

The construction of the lattice-posts F in Figs. 25 and 29 and the mode of attaching them to the arches are similar to those shown in Figs. 12 and 10, and need not be further described here.

Where the span of the bridge is very long—say two hundred and fifty feet and over—the width of the roadway should be twenty feet and over, in order to secure proper lateral stiffness at the chord-level, which is the basis of all the bridge-bracing; but this width of track makes the use of wooden floor-joist, extending from chord to chord of girders, objectionable, and makes the use of iron floor-girders at the foot of each post desirable; while, in order to secure the best results in vertical stiffness in the girders, the panels should be made of considerable length—say from fifteen to eighteen feet; and this makes it desirable that each post should be a brace-post, and consequently that each iron floor-girder should act as a brace-beam, to accomplish which we make said girders of a pair of ⊥-beams T' T' of moderate depth, which are trussed below, against downward deflection by the bridge-load, by a heavy hog-chain, $i$, attached to the beams next their ends by pins run through the webs of the beams, and running down under supports $i'\,i'$ on the under side of the beam, and which are held against upward deflection by the outward movement of the arches by a tension-rod. $i$, having an adjustable center support, $j$, on the beams T'.

Three plate-chords, C, are shown in Figs. 24 and 25, in which case the girders T' T' are secured to said chords by bolts 22 run down between the chords, through the grooved washers Y' above and below the chords, and the tie-plate D for the double set of diagonal ties A', down between the beams T' T', beneath which they are secured by washer and nuts.

The bolts E' are riveted to the angle-bars of the post F, and are secured by jam-nuts in the hole 21 of the piece $l$, (see Figs. 27,) which has the lugs 20 20 at its sides, and which fits in between the beams T', where it is secured by bolts $k$ run through the webs of the beams and the lugs 20'.

In Figs. 28 and 29 four chords, C, are used, which are arranged in pairs under the sides of the post F, in which case the bolts E', riveted to the angle-bars of said posts, run down between the two chords and the two beams, and through the grooved washers Y' and tie-plates D, as shown, and are secured by washer and nuts below the beams, thus dispensing with the use of the bolts 22 and beam-pieces $l$ in Figs. 24 and 25.

Having thus fully described our invention, what we claim therein as new, and desire to secure by Letters Patent, is—

1. The combination of an iron lattice brace-post with the arch and brace-beam of an iron bow-string bridge, said post having a vertical adjustment either at the arch or chord end, or at both of said points, substantially as and for the purpose specified.

2. The filling-plate V, in combination with the bent parts of the side bars of a lattice brace-post, F, for the purpose of preventing the buckling of said bent parts when the post is subjected to a compressive strain, substantially as specified.

3. The arch-bolt F', having a flattened head or "beaver-tail," $f'$, with recessed faces to receive post-bars $f f$, substantially as shown and specified.

4. The chord-bolt E with broad head $e$, in combination with the inside bars $f$ of the lattice brace-post of a bow-string bridge, substantially as and for the purpose specified.

5. The combination, with the arches of a bow-string bridge, of an iron lattice-girder, Fig. 5, placed between said arches, and rigidly secured thereto by plates $o$ $o$ attached to its corners, and secured above and below the arch by a bolt run through said plates and arch, substantially as and for the purpose specified.

6. The combination, with the end of a raised lattice-girder for bow-string bridges, of an arch-bolt, H, rigidly secured to said girder, and extending down through the arches of said bridge, substantially as and for the purpose specified.

7. A raised lattice-girder for bow-string bridges, having its end bars $g' g'$ arranged with bearings on the extreme horizontal parts of the arch A, and with a bolt, H, rigidly securing it to said arch, substantially as specified.

8. The combination, with the raised lattice-girder, Figs. 7, and arch A, of a tie, M, or strut M', for holding said girder against the action of the lateral ties P, substantially as specified.

9. The combination, with the arches and brace-posts of an iron bow-string bridge, of the deep iron lattice-girder, Figs. 6 and 13, secured to the arches at its upper corners by a plate, $o$ or $o'$, and at its lower corners to the posts at points considerably below the arches by one or more bolts, 16 or 17, substantially as and for the purpose specified.

10. The girder-block G'', secured on the lower corners of the deep lattice-girders specified in preceding clauses, substantially as and for the purpose specified.

11. The combination, with the brace-beam, post, and overhead lattice girders of a bow-string bridge, of a tension-rod, S, extending from the outer post of brace-beam across the post to the overhead lattice-girder, substantially as and for the purpose specified.

12. The lateral hitch-blocks N for the attachment of the lateral ties to the brace-beams or overhead girders, said blocks having holes arranged for the passage on both ties and beveled end faces for the nuts of said ties, and being secured to said beam or girder by bolts or rivets passing through the body of the block and the flanges of the beam or girder, substantially as specified.

13. The lateral compressive strut Q, secured to the arches of a bow-string bridge at the heads of the intermediate posts, and connected at its center by lateral ties to the ends of the lateral strut or girder at the head of the brace-posts, substantially as and for the purpose specified.

14. The arch-block W, rigidly secured to the arch A, and having an eye or hole, in which the end bolt of the lateral strut Q can be secured by jam-nuts, substantially as specified.

15. The grooved washer Y' and wrought-iron tie-plate D, in combination with the chords C and post-bolt E or clamping-bolt 22, substantially as and for the purpose specified.

16. The tie-plate Y, consisting of a short piece of flanged iron plate or its equivalent, having its web cut away at $y$ $y$, and with holes formed in its flanges for the insertion of the tie-pins $d'$, substantially as specified.

17. The cast end thimble $c$, having its end of the form of the section of the brace-beam T, and secured thereto by strap $c'$, fitting into the recessed part of thimble-body, and to the web of the brace-beam, substantially as specified.

18. The cast side thimble $c''$, having a rear flange, 13, fitting between the flanges at the brace-beam T, and secured thereto by strap 14, fitting into recessed part of thimble-body, substantially as specified.

19. A wrought-iron double tubular arch, having as the base of construction a horizontal plate, with two column-segments at each side, said base having combined with it suitable plates, channel-bars, and segments, to form an arch of the required cross-section and lateral capacity, substantially as is herein specified.

20. The combination, with the lower chords and brace-posts of a bow-string bridge, of a pair of rolled ⊥ or channel beams, trussed by a hog-chain on the under side, and held from upward deflection by a tension-rod on the upper side, substantially as and for the purpose specified.

As evidence of the foregoing, witness our hands this 25th day of September, A. D. 1872.

DAVID HAMMOND.
   MICHAEL ADLER.
   JOB ABBOTT.

Witnesses:
 JENNIE M. GRANT,
 GEORGE E. BUCKLEY.